United States Patent
Bunner et al.

(10) Patent No.: US 12,235,149 B2
(45) Date of Patent: Feb. 25, 2025

(54) VEHICLE WHEEL WITH MONITORING DEVICE AND MONITORING DEVICE FOR VEHICLE WHEELS

(71) Applicant: Maxion Wheels Holding GmbH, Königswinter (DE)

(72) Inventors: John Evan Bunner, Commerce, MI (US); Ralf Duning, Solingen (DE)

(73) Assignee: Maxion Wheels Holding GmbH, Königswinter (DE)

( * ) Notice: Subject to any disclaimer, the term of this patent is extended or adjusted under 35 U.S.C. 154(b) by 423 days.

(21) Appl. No.: 17/634,581

(22) PCT Filed: Sep. 9, 2020

(86) PCT No.: PCT/IB2020/058383
§ 371 (c)(1),
(2) Date: Feb. 11, 2022

(87) PCT Pub. No.: WO2021/048761
PCT Pub. Date: Mar. 18, 2021

(65) Prior Publication Data
US 2022/0283016 A1 Sep. 8, 2022

(30) Foreign Application Priority Data
Sep. 9, 2019 (DE) ...................... 20 2019 104 976.6

(51) Int. Cl.
*G01G 19/12* (2006.01)
*G01L 1/22* (2006.01)
(Continued)

(52) U.S. Cl.
CPC ............ *G01G 19/12* (2013.01); *G01L 1/2206* (2013.01); *G01L 5/1623* (2020.01); *G01L 5/163* (2013.01)

(58) Field of Classification Search
CPC ....... G01G 9/12; G01L 1/2206; G01L 5/1623; G01L 5/163; G01L 5/16; G01L 17/00; B60C 23/0498; G01B 7/16
(Continued)

(56) References Cited

U.S. PATENT DOCUMENTS

| 4,117,452 A | 9/1978 | Snyder et al. |
| 6,658,942 B1 | 12/2003 | Faesch |

(Continued)

OTHER PUBLICATIONS

European Communication pursuant to Rule 161 (1) and 162 EPC, Application No. 20772118.4, dated Apr. 24, 2022.

*Primary Examiner* — Jacques M Saint Surin
(74) *Attorney, Agent, or Firm* — MacMillan, Sobanski & Todd, LLC

(57) ABSTRACT

A vehicle wheel with monitoring device, and a monitoring device, comprising a housing which is arranged rotatably with a rim part of the vehicle wheel, an electronic circuit which is arranged in the housing and is coupled to a load detection device arranged in the housing and having strain gauges for detecting forces acting on the vehicle wheel. In order to create a monitoring device which is easy to install on different vehicle wheels and which can reliably determine the load forces occurring on the vehicle wheel, the housing has two fastening zones which are spaced apart from one another and which are connected to one another via at least one bending strut connected to both fastening zones as a component of the load detection device, at least one pair of strain gauges being arranged on the bending strut between the fastening zones for detecting the bending of the bending strut caused by load forces.

20 Claims, 4 Drawing Sheets

(51) Int. Cl.
*G01L 5/1623* (2020.01)
*G01L 5/163* (2020.01)

(58) Field of Classification Search
USPC .......................................................... 177/211
See application file for complete search history.

(56) References Cited

U.S. PATENT DOCUMENTS

| | | | | |
|---|---|---|---|---|
| 6,672,150 B2* | 1/2004 | Delaporte | ........... | B60C 23/0408 |
| | | | | 73/146 |
| 6,681,164 B2* | 1/2004 | Bergerhoff | .......... | B60C 23/0416 |
| | | | | 701/30.6 |
| 6,701,230 B2* | 3/2004 | Bergerhoff | .......... | B60C 23/0461 |
| | | | | 701/33.9 |
| 6,854,324 B2* | 2/2005 | Landes | ............... | B60C 23/0493 |
| | | | | 73/146 |
| 6,998,974 B2* | 2/2006 | Bergerhoff | .......... | B60C 23/0416 |
| | | | | 73/146 |
| 7,762,128 B2* | 7/2010 | Ozaki | .................... | B60B 27/00 |
| | | | | 73/115.07 |
| 8,125,323 B2* | 2/2012 | Stephan | .............. | B60C 23/0498 |
| | | | | 340/447 |
| 8,423,236 B2* | 4/2013 | Neuscheler | ......... | B60C 23/0408 |
| | | | | 73/146.3 |
| 9,884,525 B2* | 2/2018 | Brusarosco | ........ | B29D 30/0061 |
| 11,280,664 B2* | 3/2022 | Bunner | ................. | G01G 19/12 |
| 11,548,332 B2* | 1/2023 | Fischer | .................... | G07C 5/08 |
| 2005/0257609 A1 | 11/2005 | Mancosu et al. | | |
| 2008/0271541 A1 | 11/2008 | Neuman | | |
| 2014/0298923 A1 | 10/2014 | Geldman | | |

\* cited by examiner

VEHICLE WHEEL WITH MONITORING DEVICE AND MONITORING DEVICE FOR VEHICLE WHEELS

CROSS-REFERENCE TO RELATED APPLICATIONS

This application is a national stage of International Application No. PCT/IB2020/058383, filed 9 Sep. 2020, the disclosures of which are incorporated herein by reference in entirety, and which claimed priority to German Patent Application No. 20 2019 104 976.6, filed 9 Sep. 2019, the disclosures of which are incorporated herein by reference in entirety.

BACKGROUND TO THE INVENTION

The invention relates to a vehicle wheel with a monitoring device comprising a housing which is arranged rotatably on a rim part of the vehicle wheel, an electronic circuit which is arranged in the housing and is coupled to a load sensing device arranged in the housing and having strain gauges for sensing forces acting on the vehicle wheel, and a transceiver coupled to the electronic circuit for transmitting the load data sensed with the load sensing device to components outside the vehicle wheel.

In particular, heavy goods vehicles and normal heavy goods vehicles are subject to weight restrictions on certain routes. In order to determine the load loads in the vehicle, weight sensors can be permanently installed in a fixed frame of the vehicle between the chassis of the vehicle and the loading area of the vehicle. These corresponding load sensors are intended for the exclusive recording of the weight on the loading area of the truck. These sensors do not provide other data for other vehicle conditions and are not designed to detect other conditions, nor are they designed to detect other conditions such as mass distribution, temperature, tyre pressure, wheel camber, etc. Such load conditions and other recorded operating conditions can influence how a vehicle system reacts during driving.

It is known from DE 11 2016 004 151 T5 that a monitoring device with a load sensing device is to be mounted on the outer circumference of a rim part of a vehicle wheel in such a way that the sensor is arranged protected from environmental influences in the pressure-loaded interior of the tyre. The load sensing device shall have strain gauges designed to determine the shock loads acting on the vehicle wheel under both static and dynamic conditions by determining the forces generated by the rotation of the vehicle wheel as sinusoidal signals and by determining the wheel load from the recorded maxima. The static loads can also be recorded, including the rotational position of the monitoring device relative to the wheel contact area, if necessary, to determine the loads by correlating the strain gage measurement signals with previously recorded measurement data under different loads. In the known solution, the housing of the monitoring device is fixed to the rim drop centre, preferably by gluing, and has a base which is curved according to the curvature of the drop centre. The electronic circuit is preferably divided into two boards and the strain gauges are located on the flat upper side of the lower part of the case. A cover part is provided to protect all electronic components inside the housing. Further sensors are arranged in the housing in order to record various vehicle conditions such as wheel clamping force, wheel load, axle load, mass distribution, ambient temperature, wheel temperature and tyre air pressure, which are preferably divided into 2 boards.

The information obtained from the sensors can be used by different systems such as in particular, but not exclusively, Traction Control System (TCS), Anti-lock Braking System (ABS), Electronic Brake Force Distribution (EBD), Anti-Roll Stabilizer (AAR), Collision Prevention Braking System (CMBS), Collision Mitigation Braking (CMB), All-Wheel Drive (AWD), Tyre Pressure Control System (RDKS, TPMS), Tyre Wear and Damage Control Reporting. In order to permanently supply the monitoring device with energy, piezoelectric elements and an energy generating circuit are provided in the housing in order to convert the energy generated due to oscillations of the piezoelectric elements into electrical energy, which may be stored.

SUMMARY OF THE INVENTION

The task of the invention is to create a monitoring device for vehicle wheels and wheels which is easy to install, can be used with different vehicle wheels and can reliably determine the load forces occurring on the vehicle wheel due to the vehicle weight, the driving operation and the loading with low measuring effort.

To solve this problem, the invention suggests that the housing of the monitoring device has two fastening zones spaced from each other in the circumferential direction of the rim portion, which are connected to each other as part of the load sensing device by at least one bending strut connected to both fastening zones, at least one pair of strain gauges being arranged on the bending strut between the fastening zones for sensing the deformation of the bending strut caused by any kind of forces acting on the wheel, which forces will be named in general load forces (or strain forces).

In the invention, the load forces applied to each wheel of the vehicle by the weight of the vehicle, the driving operation and the loading is determined indirectly by the deformation of the preferably metallic part of the rim, caused by the load forces, between two fixing zones of the monitoring device having a constant and pre-determined distance. Between the fastening zones there is arranged at least one bending strut to which at least one pair of strain gauges is assigned. The data determined by the deformation of the rim at the bending strut due to the deformation of the rim by means of the strain gauges are used to determine the load forces. The deformation of the rim part between the spaced apart fastening zones will cause a corresponding deformation of the bending strut between the fastening zones, which can be detected by means of the strain gauges. The deformation to be detected might in several cases be a bending, but it might also be a torsion, internal pressure or tension on the bending strut being deformed, or any mixture thereof.

In accordance with a particularly advantageous design, a one-piece adapter plate or a multi-piece adapter device, the underside of which is adapted to the curvature of the rim part, is fastened, in particular glued, to the radially outer surface of the rim part, in particular an advantageous design, wherein the housing of the monitoring device with the fastening zones spaced apart from one another is fastened by means of detachable screw connections or pin connections to a cover side of the adapter plate which is formed remote from the base side of the adapter plate. By interposing a one-piece adapter plate or a multi-piece adapter device between the housing of the monitoring device and the surface of the rim part, identical monitoring devices with a preferably flat underside or housing underside can be fastened to differently curved rim parts. At the same time, the monitoring devices can be easily replaced without having to change the wheel rim manufacturing processes already in use, as the pin or screw connections between the adapter plate and the housing of the monitoring device can be provided. It is particularly advantageous if the adapter plate, which may be in one piece, is provided with threaded holes for screw connections offset from one another in the circumferential direction of the rim part. With the multi-piece adapter device, each adapter element can have a threaded hole and the adapter elements are positioned so that the threaded holes have the appropriate spacing. The housing of the monitoring device can then be fastened relatively easily to the adapter plate or adapter device by means of cap screws, whereby the screws reach through through-holes in the fastening zones and thereby form defined fastening zones between which the deformation of the rim part is determined by means of the bending strut and the strain gauge.

In accordance with an advantageous design, the adapter plate is flat on the cover side and/or the adapter plate has recesses or retractions for weight reduction. The adapter plate may also have a curved top surface and the housing of the monitoring device is then adapted to the shape of the top surface of the adapter plate. By means of recesses or retractions in the adapter plate, the additional weight which is introduced into the vehicle wheel by means of the adapter plate can be reduced. If several adapter elements are used, these can be designed to be correspondingly small.

According to an alternative design, the radially outer surface of the rim portion may have circumferentially spaced tapped holes or anchor pins on which the housing of the monitoring device is attached or can be attached with the spaced fastening zones. Also, anchor nuts spaced apart from one another in the circumferential direction could be fixed on the radially outer circumferential surface of the rim part, so that the monitoring device can easily be fastened on the rim part. Preferably, a pair of tapped holes, anchor pins or anchor nuts is arranged on a circumferential line being perpendicular to a wheel axis. The fixing of the anchor pins or nuts could be achieved by welding, gluing or any other suitable joining technique. The tapped holes, anchor pins or anchor nuts should be formed of fixed such that the hole axis or pin axis again is perpendicular to the wheel axis.

An inventive monitoring device for vehicle wheels, comprising a housing which can be rotatably mounted on a drop centre of a rim part of the wheel, an electronic circuit which is arranged in the housing and is coupled to a load detection device which is arranged in the housing and has strain gauges for detecting forces acting on the vehicle wheel, and a transceiver which is coupled to the electronic circuit for transmitting the load data detectable with the load detection device to components which are external to the vehicle wheel, characterized in that the load data is transmitted to the components which are external to the vehicle wheel, in that the housing has two fastening zones which are spaced apart from one another and which are connected to one another as a component of the load sensing device via at least one bending strut connected to both fastening zones, at least one pair of strain gauges for sensing the deformation of the bending strut caused by load forces being arranged on the bending strut between the fastening zones.

The ease of installation of the monitoring device is particularly advantageous if each fastening zone has at least one through-hole for a pin or screw connection; in principle, each fastening zone could have several through-holes which are preferably arranged symmetrically to the bending strut. In particular, it is advantageous if each fastening zone has exactly one through-hole for a pin or screw connection, wherein the two through-holes are positioned symmetrically with respect to the bending strut or the plurality of bending struts and in addition are positioned on the vehicle wheel in the assembled state in such a way that they lie on a common circumferential line orthogonal to the wheel axis of the vehicle wheel.

The housing expediently has a cavity spanned by housing walls for encapsulating the electronic circuit, the at least one bending strut being positioned within or bounding the cavity. According to a design, a single bending strut may be arranged between the fixing zones and/or the centres of the fixing holes, symmetrically arranged to an imaginary connecting line between the fixing holes or their centres, the bending strut preferably being associated with only a pair of strain gauges.

According to an alternative design, the bending strut can be partially two-armed between the fastening zones and/or the centres of the fastening holes, whereby preferably only one strain gauge is assigned to each arm of the bending strut.

In both the above designs, the flexible struts/flexible struts can be detachably connected to the fastening zones, in particular via a cylindrically widened head at the strut end, which is inserted into a suitably designed cylindrical receptacle in the fastening zone transversely to the direction of extension of the flexible strut, and is anchored there in particular by means of a press or transition fit. It is also particularly advantageous if the strain gauges are arranged in portions of the bending strut which are adjacent to a bending hinge integrally formed on the bending strut or opposite to a bending hinge integrally formed, for example a notched bending hinge, in order to increase the flexibility of the bending strut and thus the signal detectable by means of the strain gauges via the notch and the notched geometry. By providing or assigning a flexible mechanism with a flex hinge or bending hinge on the bending strut, the measuring accuracy of the monitoring device is significantly increased.

In accordance with an alternative advantageous design, the bending strut may be formed as a pair of cross struts adjacent to one of the fastening zones and extending with each cross strut orthogonally to the direction of displacement between the two fastening zones, preferably each cross strut being associated with a strain gage of a pair of strain gages. Preferably in this configuration, a bending hinge integrally formed on the housing is provided between the transverse struts and the fastening zone, wherein preferably the strain gauge is fastened to the associated bending strut in each case near the associated bending hinge. Here, too, the precision and measuring accuracy of the monitoring device, which detects the deformations of the rim part in the circumferential direction as a measure of the load forces, is significantly improved by means of the flexible mechanism brought about by the flex hinge or bending hinge, since the flex hinges amplify the deformation and thus the signal output.

It is particularly advantageous when designing with a pair of cross struts if the fastening zone arranged adjacent to the pair of cross struts has a single through hole, the ends of the cross struts of the pair of cross struts being connected to the other fastening zone via wall webs. It is particularly advantageous if the fastening zone adjacent to the pair of cross struts is designed as a mounting eye tapered symmetrically to the bending hinges. In this design in particular, a bending hinge can be arranged in the connection area between the fixing eye and the corresponding cross struts of the cross strut pair.

The fixing eye can only merge into the cross struts via a narrow web, which is additionally tapered by bending hinges. It is also possible that connecting walls are formed between the fixing eye and the outer ends of the transverse struts, the connecting walls then preferably having wall thicknesses which are at least 30% thinner than the maximum wall thickness of the transverse struts and/or that the connecting walls are provided with at least one fold or rounding, whereby the influence of the connecting walls on the deformations detectable on the transverse struts by means of the strain gauges is reduced despite the presence of the connecting walls.

According to another embodiment for the monitoring device, the bending strut partly could comprises or could consist of a rectangular bending frame with transverse connecting arms and longitudinal bending arms, wherein the transverse connecting arms are extending orthogonally to the direction of offset between the two fastening zones. Preferably, strain gauges are arranged in pairs and each strain gauge of the pair of strain gauges is assigned or fixed on each of the longitudinal bending arms. The strain gauges could be arranged on the inner or outer side face of the longitudinal bending arms only, or preferably, there are two pairs of strain gauges with one strain gauges of each pair being arranged on the inner side of the longitudinal bending arms and one strain gauge of each pair being arranged on the outer side of the longitudinal bending arms.

It is particularly advantageous if the bending strut with the rectangular bending frame is detachably connected to the fastening zones. A detachably connection could be achieved via connecting parts being fixed with one end to the transverse connecting arm and comprising at its other end a pin-head portion insertable into a receptacle at the corresponding fastening zone facing the bending strut.

According to a preferred embodiment, each connecting part is triangularly formed with a triangle base and a triangle tip, wherein the pin-head portion is formed on the triangle base and the triangle tip is connected to the connecting arm, wherein preferably bending hinges are formed integrally at the connecting arm adjacent the triangle tip.

The detachably connection could be achieved according to one embodiment by a self-centering, preferably three-point connection between head portion on the strut end and receptacle at the fastening zone, wherein preferably, the bending frame, the pin-head portions, the receptacles and the connecting parts are arranged symmetrically to a circumferential line again running perpendicular to the wheel axis. In order to have a good interference between the detachable bending strut and the receptacles at the fastening zones, it is preferred that the pin-head portions have an outer radius or curvature being slightly bigger than the inner radius or curvature of the receptacles, and or that the distance between the centres of the pin-head portions is bigger than the distance between the centres of the receptacles.

Also, according to one advantageous embodiment, the housing of the monitoring device could comprises at least two, preferably three sections building a main section comprising the fastening zones, and at least one side section, wherein the bending strut is arranged in the main section and the electronic circuit and/or energy cells are arranged in the at least one side section. The housing could be fixed to the rim part such that the main section with the bending strut extends between the fastening zones, while the side section/s are arranged circumferentially offset of the fastening zones. By several sections, the housing will be longer, but also thinner reducing collisions with the tyre during tyre fitting.

As already known from the state of the art, in addition to the load sensing device, the monitoring device may comprise an accelerometer and/or a temperature sensor and/or an angle sensor and/or a pressure sensor for the acquisition of further operating data, and/or the monitoring device may be provided with rechargeable energy cells and piezo elements for energy generation for the energy cells in order to enable continuous operation. However, as the monitoring device can easily be replaced, especially with a screw or pin connection, the monitoring device can also be fitted with a battery with a limited service life.

Other advantages of this invention will become apparent to those skilled in the art from the following detailed description of the preferred embodiments, when read in light of the accompanying drawings.

DETAILED DESCRIPTION OF THE INVENTION

Figure 1:
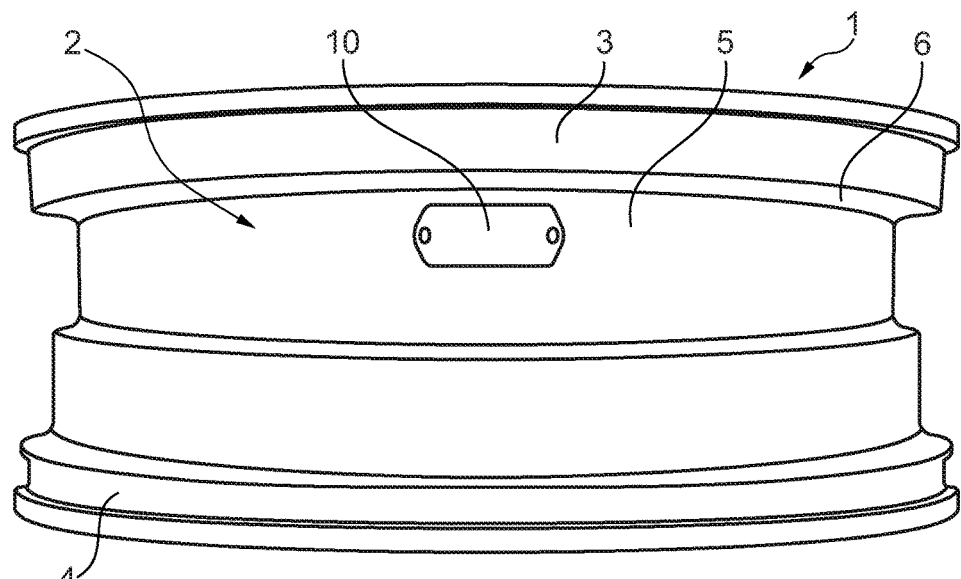
FIG. 1 shows schematically simplified and not true to scale a vehicle wheel in plan view of the rim part with mounted monitoring device.

In FIG. 1 a vehicle wheel for a passenger car or a commercial vehicle is designated altogether with reference sign 1, which has in a manner known per se a rim part 2, which can be of any construction or design type and is connected or formed with an unrepresented dish part, by means of which the vehicle wheel 1 comprising the key part and rim part can be connected to the hub of a vehicle. The vehicle wheel can be composed of a separately manufactured rim part and bowl part, but it can also consist of a single cast part. The rim part 2 has two rim shoulders 3, 4 to support a tyre not shown, between which there is a rim drop centre 5 with two drop centre sides 6, 7. The visible surface of rim part 2 in FIG. 1 forms its outer circumferential or lateral surface, which is symmetrical around a wheel axis. In the design example shown, in the area of the rim drop centre 5 on the outer circumferential surface of the drop centre, a monitoring device designated as a whole with reference sign 10 is attached to two fastening zones spaced apart from each other in the circumferential direction of the drop centre, in such a way that the monitoring device extends with its longer axis in the circumferential direction. The attachment of the monitoring device 10 to the drop centre floor of the rim drop centre 5, in particular near the outer drop centre flank 6, i.e. facing away from the wheel hub, forms the preferred mounting position for the monitoring device 10; however, the monitoring device 10 could also be attached to other areas of the rim part 2. When tyres are fitted, the monitoring device 10 is located in the pressure-loaded interior of the tyre.

Figure 2:
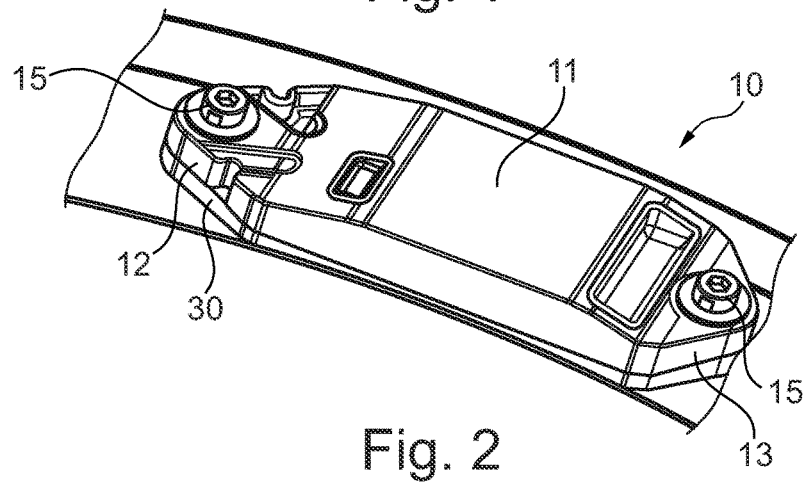
FIG. 2 shows in perspective view the monitoring device mounted on the only partially shown rim part.
Figure 3:
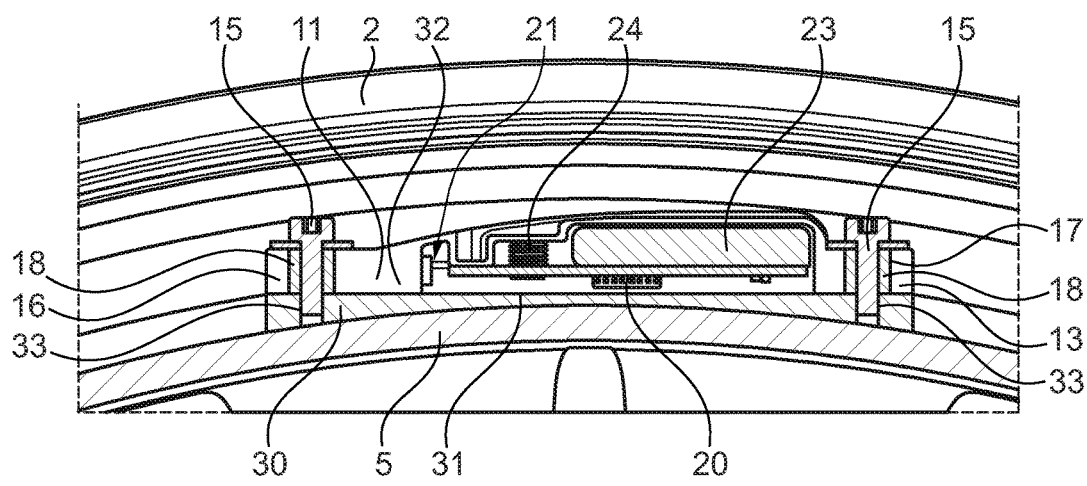
FIG. 3 shows a longitudinal section through the monitoring device mounted on the rim part according to FIG. 2.

FIGS. 2 and 3 show the monitoring device 10 in perspective view and sectional view according to a first embodiment. As can be seen, the monitoring device 10 has a housing 11, which is not directly but only indirectly connected to the rim drop centre 5, because the housing 11 is fastened to an adapter plate 30, which itself is fastened to the surface of the rim drop centre 5, in particular glued in. The adapter plate 30 has a base side 31 which is precisely adapted to the curvature of the drop bed base of the rim drop bed 5 and thus lies flat against the drop bed base 5. The adapter plate 30 has a cover side 32, which is flat in the design example shown, so that the housing 11 of the monitoring device 10 itself can have a flat underside 12. The advantage of using an adapter plate 30 is that by using a different adapter plate it is possible to adapt it to different radii of curvature of the rim part, so that the same or each identical monitoring device can also be used on other vehicle wheels with different dimensions.

The mounting between housing 11 of the monitoring device 10 and the adapter plate 10 located underneath is not flat but only on two fastening zones 12, 13, which are in circumferential contact with each other, and in the design example shown in each case by a cap screw 15 for each fastening zone 12, 13, with which the housing 11 of the monitoring device 10 is screwed onto the adapter plate 30. The adapter plate 30 therefore has a threaded hole 33 for each of the two cap screws 15, whereby the distance between the two threaded holes 33 is adapted to the distance between one through hole 16 in one fastening zone 12 and another through hole 17 in the other fastening zone 13. In the example shown, a sleeve 18 is inserted in each of the two through holes 16, 17 and is penetrated by the shank of the cap screw 15. The adapter plate 30 and thus also the monitoring device 10 are positioned on the rim drop centre in such a way that the two threaded holes 33 are aligned with a circumferential line parallel to the circumferential direction and thus orthogonal to the wheel axis.

The forces introduced into the rim part as a result of external influences, in particular vehicle weight and load of the vehicle, lead to a deformation of the rim part in the circumferential direction with a maximum in the area of the wheel contact surface, and the monitoring device 10 with its load detection device is designed to detect these deformations for determining the load forces actually acting on each vehicle wheel by means of a sensor system described below. During a movement of the vehicle, the monitoring device 10, which rotates with the vehicle wheel in a fixed motion, reaches the position facing the wheel contact surface per revolution and in this position the maximum of the deformation can be detected per revolution. If in each fastening zone 12, 13 only one screw connection is used to fix the fastening zones 12, 13 to the adapter plate underneath and both screw connections are in contact with each other in the direction of rotation of the vehicle wheel, the deformations can be detected essentially free of transverse forces with a suitable sensor system. For this it is also not necessary for the adapter plate 30 to lie flat against the rim drop centre 5, because it is also sufficient for the detection of deformations if the adapter plate is in contact with the outer circumferential surface of the rim part exclusively in the area of the two fastening zones offset to each other in circumferential direction or below and adjacent to the threaded holes. The intermediate area of the adapter plate could be provided with recesses or retractions, which is advantageous for minimizing the additional weight caused by the adapter plate. Or instead of a one-piece adapter plate, an adapter device with several adapter elements is used.

In order to detect the deformation of the rim part caused by the weight and load forces and to transmit it to external components such as the vehicle electronics or an on-board computer, an electronic circuit 20 shown here only symbolically in FIG. 3 above the printed circuit board is arranged in the interior of the housing 11 of the monitoring device 10, which is coupled to a load detection device coupled to at least one pair of strain gauges 21 and to a transceiver which is not shown in detail and via which the load data detected by the load detection device can be transmitted contactlessly, for example by radio, to the corresponding components external to the wheel. The electronic circuit 20 is supplied by means of a battery 23 which is arranged in the interior of the housing 11, encapsulated against external influences, and the electronic circuit 20 may have further sensors, such as a pressure sensor 24, an acceleration sensor, a temperature sensor (not shown), an angle sensor or the like, in order to determine further operating data on the associated vehicle wheel and also to determine the position of the monitoring device relative to the wheel contact surface.

With the invention monitoring device 10, the load detection device detects the deformations occurring on the housing 11 between the two fastening zones 12, 13, in the design example shown between the two axes of the respective cap screws 15 or the axes of the associated through holes 16, 17. The greater the distance between the two fastening zones 12, 13, the better the deformations of the wheel rim in the circumferential direction can be detected. In the design example shown, both fastening zones 12, 13 are therefore located at the opposite ends of the housing 11, and the entire electronics, together with any further sensors and the circuit board of the electronic circuit 20 that may be present, are located between the two fastening zones 12, 13. However, it would also be possible to arrange the fastening zones 12, 13 at a smaller distance from one another and to arrange the electronic circuit and the receiver completely or partially in areas that do not lie between the two fastening zones 12, 13.

Figure 4:
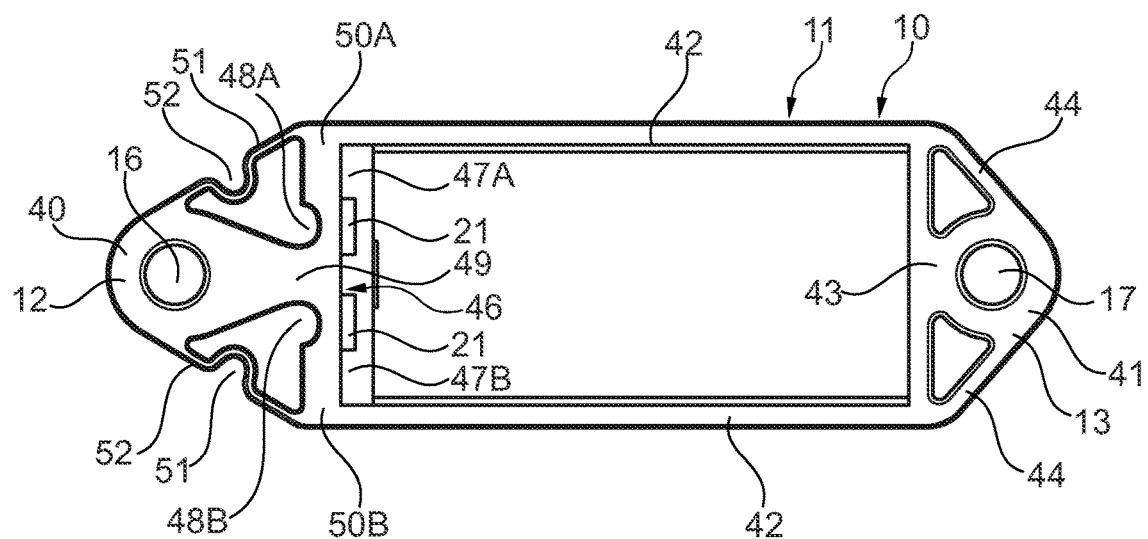
FIG. 4 shows schematically simplified the structural internal structure of the monitoring device according to FIG. 2 in plan view.

The load sensing device can be installed and arranged in different ways between the two fastening zones. FIG. 4 schematically shows the basic principle of the load sensing device in the monitoring device 10 as shown in FIGS. 2 and 3. As can be clearly seen from the top view of the housing 11, the two fastening zones in which the offset through-holes are located are each designed as mounting eyes 40, 41 which are different from one another. The mounting eye 40 is located near the two strain gages 21 of the pair of strain gages, the mounting eye 41 is located remote from the strain gages 21. Between the two fixing eyes 40, 41, the housing 11 has two outer, web-like side walls 42 which run parallel to one another and, in the mounting state of the monitoring device 10, extend on a vehicle wheel parallel to the circumferential direction of the vehicle wheel. The mounting eye 41 is integrally connected via several webs 43, 44 to the right ends of the side walls 42 in FIG. 4, whereby the mounting eye 41 is relatively rigidly connected to the side walls 42.

The mounting eye 40, on the other hand, tapers much more in the direction of a connecting bridge 46, which runs perpendicular to the side walls 42. The fixing eye 40 forming the fixing zone 12 is therefore connected to the fixing eye 41 forming the other fixing zones 13 via the connecting web 46, the side walls 42 and the webs 43, 44. With respect to the mounting eye 40, the connecting web 46 forms two cross struts 47A, 47B of a cross strut pair, each of the cross struts 47A, 47B being associated with a strain gauge 21. The two cross struts 47A, 47B each form bending struts in the monitoring device 10, into which the deformations of the housing between the two fastening zones 12, 13 or the mounting eyes 40, 41 forming these are introduced, in order to detect the deformations and thus a sensor signal for the load forces by means of the strain gauges 21. The deformation capacity of the two cross struts 47A, 47B, which form the respective bending struts of the load sensing device, is determined by the arrangement of one bending hinge 48A, 48B each between the foot area 49 of the fixing eye 40 and the connecting web 46, which forms the cross struts 47A, 47B with its partial section, and the strain gauges 21 are positioned opposite to the bending hinges 48A, 48B, symmetrically with respect to the foot area 49 of the mounting eye 40, in order to detect the greatest caused deformation in the longitudinal direction of the housing free of transverse forces. The two bending hinges 48A, 48B can, as schematically shown, be formed by notched hinges (solid-state hinges), which are produced by an additional notch at the transition of the foot area 49 to the cross struts 47A, 47B. The bending hinges form a flexible mechanism to increase the detectable deformations, as is known to the expert, which is why reference is made to the general specialist knowledge.

In the design example in FIG. 4, an additional connecting wall 51 is formed on both sides between the fixing eye 40 and the outer end 50A, 50B of each cross member 47A, 47B or the adjacent side wall 42. The connecting wall 51 each has a thickness at least 30% lower than the thickness of the side walls 42 and/or the bending struts in order to reduce the effect of the connecting walls 51 on the bending struts 47A, 47B and the bending hinges 48A, 48B. For further decoupling, the connecting walls 51 are each provided with a semi-circular rounding 52 or at least one fold (not shown). In the case of different loads on the vehicle wheel, for example due to different heavy payloads or unequally distributed payloads, the rim part of the respective vehicle wheel experiences different deformations which lead to different deformations of the respective bending struts 47A, 47B, to which the strain gauges 21 are assigned. The respective sensor signals of the strain gauge 21, which are connected to the electronic circuit 20 in a suitable way known to the specialist, can be compared with reference values, for example from a lookup table, which are determined beforehand for the respective vehicle in the unloaded state as well as for other predefined states. By correlation with these data, the load forces can then be determined and critical loads or load conditions can be reported to the driver, for example. At the same time, the load data determined with the load sensing device can be fed to other systems, as described in the description at the beginning with reference to the state of the art.

Figure 5:
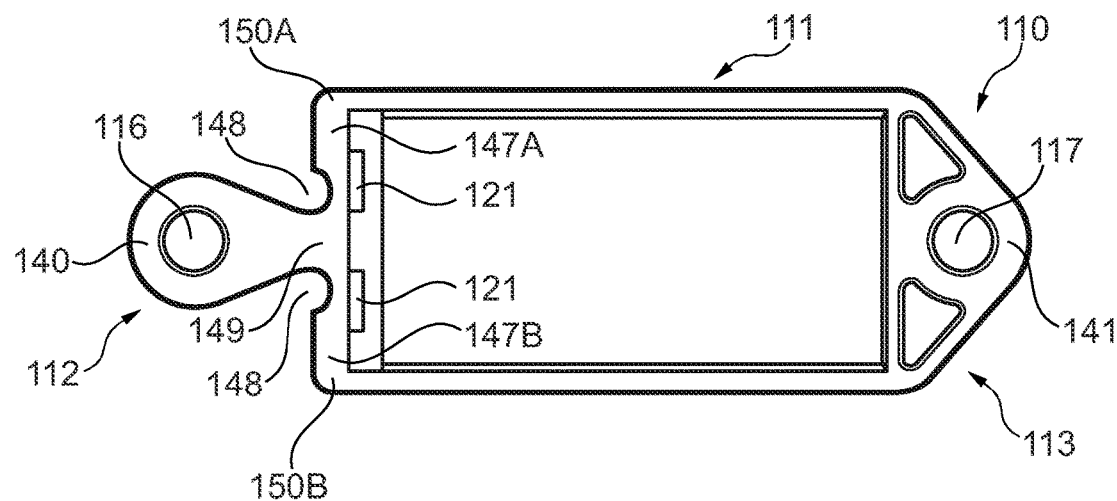
FIG. 5 shows schematically simplified the structural internal structure of a monitoring device similar to, but as an alternative to, the design example shown in FIG. 4.

The design example of a monitoring device 110 shown in FIG. 5 has essentially the same structure as the previous design example. Also here the strain gauges 121 are assigned to a pair of cross struts 147A, 147B, whose bending capacity is significantly increased in response to deformation of the rim part by flexible hinges 148 as a compliant mechanism at the transition of the mounting eye 140 into the cross struts 147A, 147B. The only difference to the previous example is that there is no further connection between the outer ends 150A, 150B and the load sensing mounting eye 140 of the mounting zones 112. On the mounting eye 141 or the mounting zone 113, however, the housing 111 of the sensor is designed identically to the previous design example.

Figure 6:
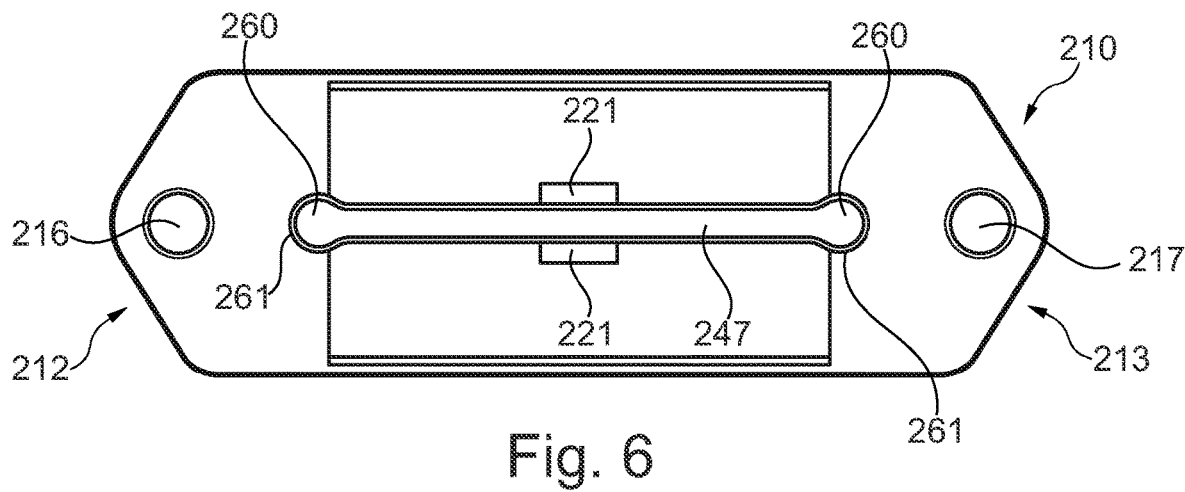
FIG. 6 shows schematically simplified the structural internal design of a monitoring device according to an alternative design example with linearly extending bending struts between the fastening zones.
Figure 7:
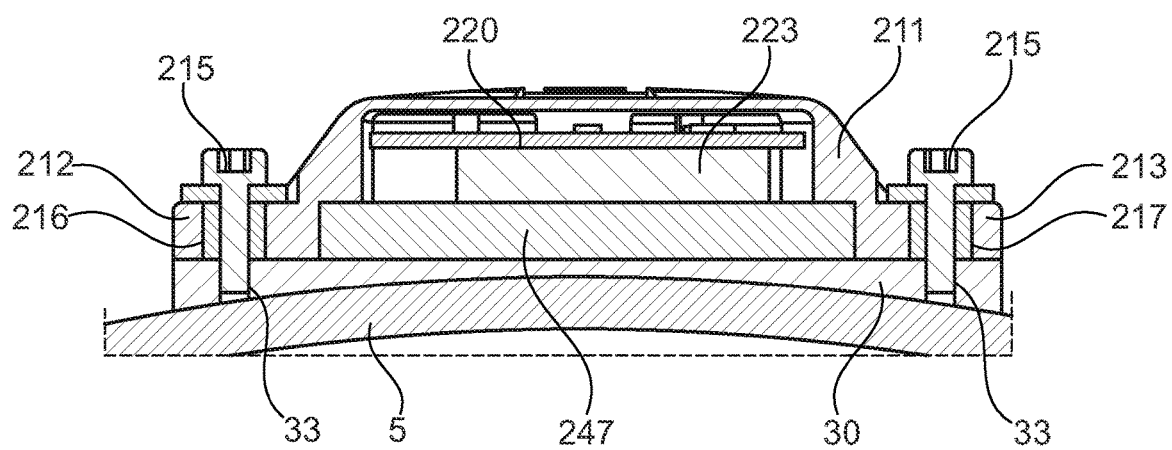
FIG. 7 shows a longitudinal section through the monitoring device mounted on the rim part according to FIG. 6.

FIGS. 6 and 7 show another example of a 210 monitoring device. Here, too, the connection between the housing 211 of the monitoring device 210 and a drop centre 5 of a rim part of a vehicle wheel, shown schematically in FIG. 7, is made via an adapter plate 30, which can have the same structure as in the previous design example, and via two cap screws 215, which penetrate through holes 216, 217 in the two fixing zones 212, 213 of the housing 211 and are detachable in threaded holes 33 in the adapter plate 30 and are therefore screwed in for easy installation and replacement of the monitoring device 210. The monitoring device 210 also has a bending strut 247, but this bending strut 247 extends in a straight line between the two fixing zones 212, 213, symmetrically to the centre axis or centre of the two fixing holes 216, 217. In the design example shown, the bending strut 247 is arranged in the lower, bottom-side area of the interior of housing 211 near adapter plate 30, and housing 211 forms a hood spanning this area, the printed circuit board of the electronic circuit 220 together with the battery 223 being arranged above the bending strut 247. The bending strut 247 has at both ends cylindrically shaped, widened heads 260, which are inserted and anchored into cylindrical receptacles 261, which are located in the respective foot areas of the two fastening zones 212, 213 of the housing, and which are aligned and symmetrical to a connecting line between the two centres of the fastening holes 216, 217. The strain gauges 221 measure the different deflections of the bending strut 247 which occur due to different deformation of the rim part in the circumferential direction.

Figure 8:
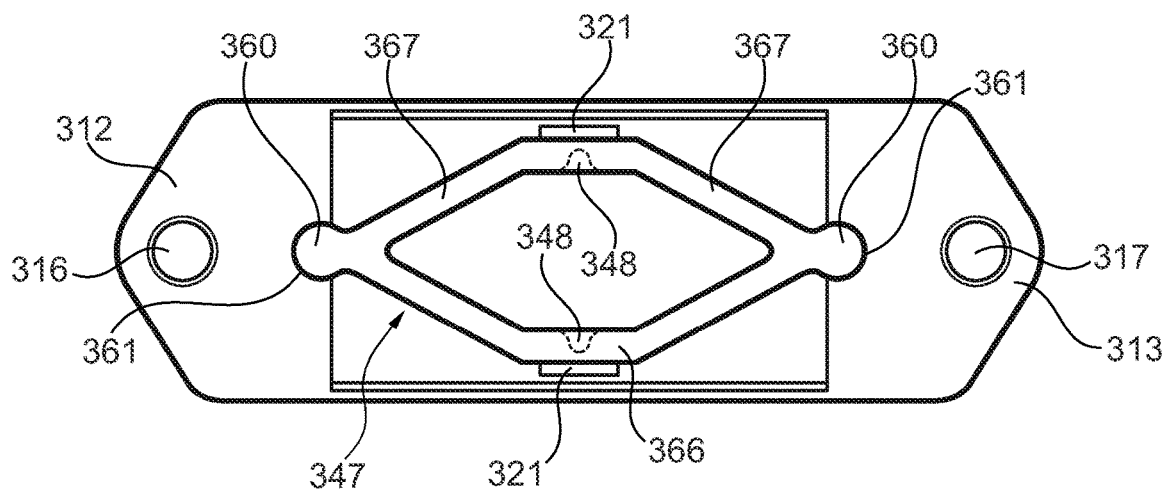
FIG. 8 shows schematically simplified the structural internal design of a monitoring device according to another alternative design example with a partially two-armed bending strut extending between the fastening zones.

FIG. 8 shows another alternative design example similar to the design example given in FIG. 6. Here, too, the two fixing zones 312, 313, which have the fixing holes 316, 317 for screw or pin connections with an adapter plate, are provided on the rear with a receptacle 361 for the widened head 361 of a bending strut 347. However, the bending strut 347 has two arms 365A, 365B, which span an approximately diamond-like gap and each have a middle section 366, which runs parallel to the circumferential direction, albeit laterally offset to the direct connecting line between the two fixing holes 316, 317, and is connected via inclined sections 367 to the respective head 361 at the end of the bending strut 347. Halfway between the two heads 360, both center sections 366 may each have, as indicated by dashed lines, a notch hinge 348 as a flex hinge or bending hinge to increase the flexibility of the bending strut in the detection region of the strain gages 321 disposed opposite the flex hinges at the center section 366.

FIGS. 9 to 11 again shown another alternative embodiment for a monitoring device 410 fixed to the rim part 2 of a vehicle wheel. As can be seen from FIG. 9, the monitoring device 410 is equipped with a housing 411 being much longer and thinner compared to the other embodiments. Similar as within the previous embodiments, the housing 411 is attached to the rim part 2 of the wheel by means of two tap screws 415, which penetrate with their screw shank respective through holes 416 in each of the fastening zones 412, 413 and which are screwed into anchor nuts 433, shown in FIG. 10, being welded or glued onto the outer circumference of the rim part (2, FIG. 9). An optimized fastening is achieved by washers 414 underneath the cap of cap screws 415 as well as safety sleeves within the through holes 416.

Figure 9:
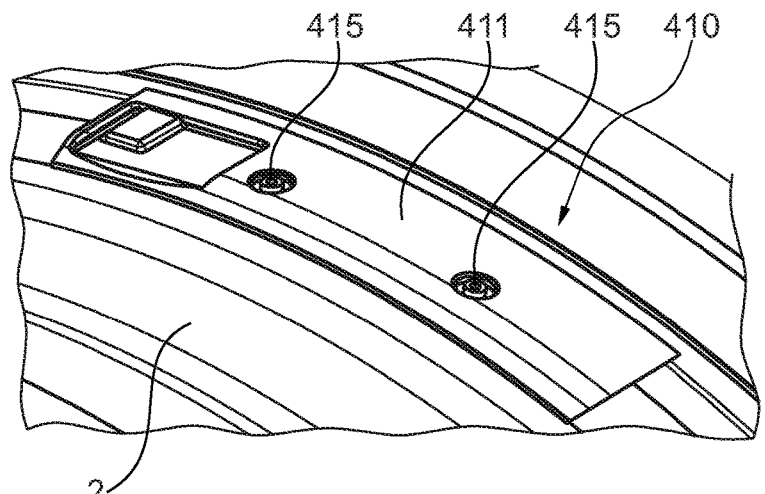
FIG. 9 shows in perspective view a monitoring device according to an alternative embodiment mounted on the rim part (partially shown)
Figure 10:
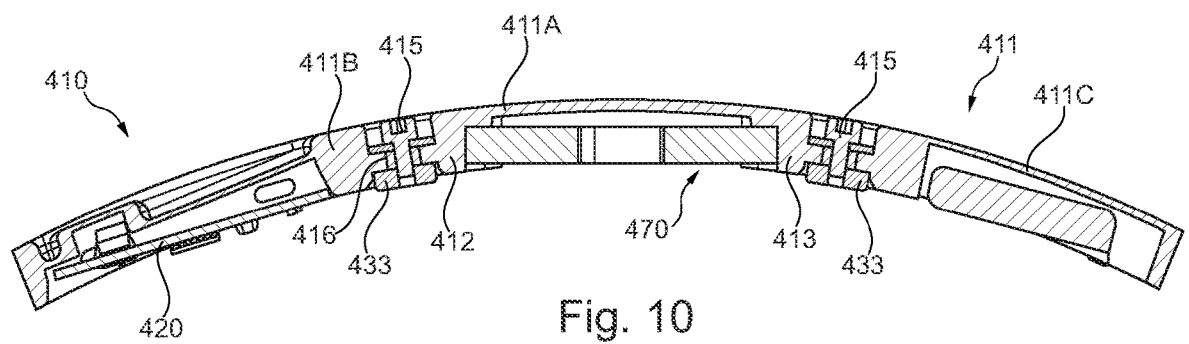
FIG. 10 shows a longitudinal section view through the monitoring device mounted on the rim part according to FIG. 9.
Figure 11:
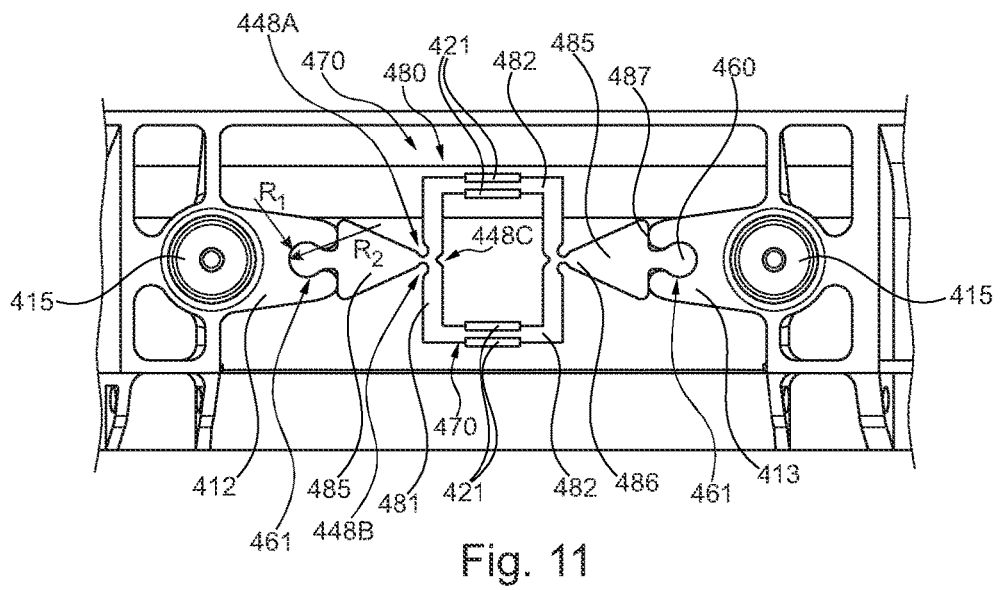
FIG. 11 shows schematically simplified the structural internal design of the load strut of the monitoring device according to FIGS. 9 and 10.

As can be seen from FIG. 9 and FIG. 10, the housing 411 comprises in the shown embodiment, a total of three sections, namely a main section 411A in the middle, comprising the fastening zones 412, 413, as well as the bending strut configuration 470 for detecting the load data, while an electronic circuit 420 is arranged outside the main section 411A in a side section 411B being circumferentially offset from the main section 411A. In another side section 411C, being arranged circumferentially offset to the other side of the main section 411A, the battery cell for energy supply of the electronic circuit is arranged, so the entire monitoring device 410 is much thinner compared to the embodiments in FIG. 1-8.

Also, the design and construction of the load strut is different compared to the embodiments in FIG. 1-8. As can best be seen from FIG. 11, the load strut, designated in its entirety with 470 is detachably connected to the fastening zones 412, 413 by means pin-head portions 460 inserted from above into receptacles 461 at inner ends of the fastening zones 412, 413. Both the pin-head portions 460 and the receptacles 461 have matching cylindrical parts with a radius or curvature such that the inner radius/curvature R2 inside the receptacles 461 is slightly greater than the outer radius/curvature R1 of the pin-head portions 460. In addition, the distance of the centres of the pin-head portions 460 is slightly greater than the distance of the receptacles 461 so that a tight interference is achieved, locking the load strut 470 inside the receptacles 461 between the fastening zones 412, 413.

The load strut 470 partly comprises a rectangular bending frame having transverse extending connecting arms 481 and longitudinal extending bending arms 482, with strain gauges 421 being attached to the longitudinal extending bending arms 482. In the shown embodiment, there are four strain gauges 421 building two pairs, one pair being positioned on the inner side of the longitudinal bending arms 482 and the other pair attached to the outer side of the longitudinal bending arms 482; however, it would be sufficient just to have one pair either on the inner side or on the outer side. Between each of the connecting arms 481 and the pin-head portions 460 are integrally formed on the load strut 470 a pair of triangle formed connecting parts 485 having a triangle tip 486 being connected to the connecting arms 481, and having a triangle base 487, at which the pin-head portions 460 are formed as extensions.

In order to better or amplify the signal output of the strain gauges 421, the bending strut 470 comprises here three flex hinges 448A, 448B, 448C on the connecting arms 481 adjacent the triangle tip 486, with two of the flex hinges 448A, 448B being positioned in close vicinity to the connecting foot of the triangle tip 486 with the connecting arm 481, and the third flex hinge 448C being positioned opposite the triangle tip 486 on the inside of the rectangular frame 480. Also, in order to minimize influences due to the fixing of the load strut 470 in the receptacles 461 on the fastening zones 412, 413, the contacting area between the pin-head portions 460 and receptacles 461 is reduced by gaps between the rounded, fork-like inner front parts of the fastening zones 412, 413 and the triangle base 486 and the pinhead portions 460.

For the expert, the previous description results in numerous modifications which should fall within the scope of protection of the attached claims. Some of the embodiment examples show the fastening of a housing by means of an adapter plate, which is one preferred design example option. The adapter plate could also be in two parts and have two unconnected plate sections each having only one threaded hole for fixing the monitoring device by means of a screw or anchor pin to which one of the fixing zones of the monitoring device housing is fixed. It would also be possible to create two spaced zones, each with a threaded hole or an anchor pin, on the rim part, all with anchor nuts attached to the rim part, as shown in the last embodiment, in a suitable manner in order to detachably attach the housing of the monitoring device to the circumference of the rim part. Each fixing zone could also have several fixing points, preferably distributed symmetrically to the strain gauges of the load sensing device. If there are several fixing points, however, the measurement result may be significantly more falsified due to different clamping forces between the housing and rim part. In addition, the invented sensor could also be equipped with piezo elements and a power generation circuit to increase the service life of the monitoring device.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. Vehicle wheel with monitoring device, the monitoring device comprising: a housing which is arranged on a rim part of the vehicle wheel and jointly rotatably with the rim part of the vehicle wheel, an electronic circuit which is arranged in the housing and is coupled to a load detection device which is arranged in the housing and has strain gauges for detecting forces acting on the vehicle wheel, and a transceiver which is coupled to the electronic circuit for transmitting the load data detected with the load detection device to components outside the vehicle wheel, wherein the housing has two fastening zones which are spaced apart from one another and which are connected to one another via at least one bending strut connected to both of the two fastening zones as a component of the load detection device, at least one pair of strain gauges being arranged on the bending strut between the two fastening zones for detecting the deformation of the at least one bending strut caused by load forces, wherein the housing has a cavity spanned by housing walls for encapsulated reception of the electronic circuit, the at least one bending strut being positioned within the cavity.

2. Vehicle wheel according to claim 1, wherein a one-piece or multi-piece adapter plate a base side of the adapter plate is adapted to the curvature of the rim part, is fastened, to the radially outer circumferential surface of the rim part, wherein the housing of the monitoring device with the spaced fastening zones is fastened by means of detachable screw connections or pin connections to a cover side of the adapter plate formed remote from the base side of the adapter plate, wherein the one-piece adapter plate is provided with threaded holes for screw connections which are arranged offset from one another in the circumferential direction of the rim part, or two adapter plates are provided which each have a threaded hole for a screw connection.

3. Vehicle wheel according to claim 2, wherein the adapter plate is flat on the cover side and/or in that the adapter plate has recesses or retractions.

4. Vehicle wheel according to claim 1, wherein tapped holes or anchor pins or anchor nuts are formed on or are fixed to the radially outer circumferential surface of the rim part, which are spaced apart from one another in the circumferential direction, on which tapped holes or anchor pins or anchor nuts the housing of the monitoring device is fastened or fastenable with the spaced fastening zones, wherein a pair of holes, anchor pins or anchor nuts is arranged on a circumferential line being perpendicular to a wheel axis.

5. Vehicle wheel according to claim 1, wherein each fastening zone has at least one through hole for a pin or screw connection, being positioned symmetrically to the at least one bending strut.

6. Vehicle wheel according to claim 1, wherein a single bending strut is arranged between the fastening zones and/or centres of fastening holes in the fastening zones, which single bending strut lies symmetrically in each case with respect to an imaginary connecting line between the fastening holes, the single bending strut preferably being assigned only one pair of strain gauges.

7. Vehicle wheel according to claim 1, wherein the at least one bending strut is formed partially with two arms between the fastening zones and/or the centres of the fastening holes, wherein only one strain gauge is associated with each arm of the bending strut.

8. A vehicle wheel according to claim 7, wherein the at least one bending strut is detachably connected to the fastening zones, via a cylindrically widened head at the strut end, which is inserted into an associated cylindrical receptacle at the fastening zone transversely to the extension direction of the at least one bending strut, and/or that the strain gauges are arranged in portions of the at least one bending strut which are adjacent to a bending hinge formed integrally on the at least one bending strut or which lie opposite to the bending hinge.

9. Vehicle wheel according to claim 1, wherein the at least one bending strut is designed as a pair of transverse struts which is designed adjacent to one of the two fastening zones and extends with each transverse strut orthogonally to the direction of offset between the two fastening zones, a strain gauge of a pair of strain gauges being assigned to each transverse strut.

10. Vehicle wheel according to claim 9, wherein a respective bending hinge formed integrally on the housing is provided between the transverse struts and the fastening zone, the strain gauge being fastened in each case near the associated bending hinge to the associated bending strut.

11. Vehicle wheel according to claim 9, wherein the fastening zone arranged adjacent to the pair of transverse struts has a single through hole, outer ends of the transverse struts of the pair of transverse struts being connected to the other fastening zone via wall webs.

12. Vehicle wheel according to claim 11, wherein the fastening zone arranged adjacent to the transverse strut pair is designed as a mounting eye which tapers symmetrically with respect to the bending hinges.

13. Vehicle wheel according to claim 12, wherein connecting walls are formed between the mounting eye and the outer ends of the transverse struts, the connecting walls having wall thicknesses which are at least 30% thinner than a maximum wall thickness of the transverse struts and/or which are provided with at least one fold or rounding.

14. Vehicle wheel according to claim 1, wherein the at least one bending strut is designed as deformation amplifier, wherein the at least one bending strut comprises bending hinges or flex hinges to amplify the deformation of the at least one bending strut caused by the load forces acting on the vehicle wheel.

15. Vehicle wheel according to claim 1, wherein the at least one bending strut partly comprises a rectangular bending frame with transverse connecting arms and longitudinal bending arms, the transverse connecting arms extending orthogonally to the direction of offset between the two fastening zones, and a strain gauge of a pair of strain gauges being assigned on each of the longitudinal bending arms.

16. Vehicle wheel according to claim 15, wherein the at least one bending strut with the rectangular bending frame is detachably connected to the two fastening zones, by means of connecting parts being fixed with one end to the connecting arm and comprising at its other end a pin-head portion insertable into a receptacle at the fastening zone.

17. Vehicle wheel according to claim 16, wherein each connecting part is triangularly formed with a triangle base and a triangle tip, wherein the pin-head portion is formed on the triangle base and the triangle tip is connected to the connecting arm, wherein bending hinges are formed integrally at the connecting arm adjacent the triangle tip.

18. Vehicle wheel according to claim 16, wherein a self-centering, three-point connection between pin-head portion on the strut end and receptacle at the fastening zone, wherein the bending frame, the pin-head portions, the receptacles and the connecting parts are arranged symmetrically to a circumferential line running perpendicular to a wheel axis.

19. Vehicle wheel according to claim 1, wherein the housing of the monitoring device comprises at least two sections having a main section comprising the fastening zones, and at least one side section, wherein the at least one bending strut is arranged in the main section and the electronic circuit and/or energy cells are arranged in the at least one side section.

20. Vehicle wheel according to claim 1, wherein in addition to the load detection device, the monitoring device has an accelerometer sensor and/or a temperature sensor and/or an angle sensor and/or a pressure sensor for detecting further operating data, and/or the monitoring device is provided with rechargeable energy cells and piezo elements for generating energy for energy cells.

\* \* \* \* \*